US012803363B2

(12) United States Patent
Dong et al.

(10) Patent No.: US 12,803,363 B2
(45) Date of Patent: Nov. 17, 2026

(54) ELECTRIC MOTOR HAVING AN ACCOMMODATION SPACE FOR RETAINING DEBRIS BETWEEN A STATOR AND A CASING

(71) Applicant: Nidec Corporation, Kyoto (JP)

(72) Inventors: Xiuquan Dong, Dalian (CN); Liu Ling, Dalian (CN); Baojun Luan, Dalian (CN); Hao Wu, Dalian (CN)

(73) Assignee: NIDEC CORPORATION, Kyoto (JP)

( * ) Notice: Subject to any disclaimer, the term of this patent is extended or adjusted under 35 U.S.C. 154(b) by 194 days.

(21) Appl. No.: 18/744,808

(22) Filed: Jun. 17, 2024

(65) Prior Publication Data

US 2024/0421651 A1 Dec. 19, 2024

(30) Foreign Application Priority Data

Jun. 19, 2023 (CN) ......................... 202310728466.2

(51) Int. Cl.
*H02K 5/10* (2006.01)

(52) U.S. Cl.
CPC ..................................... *H02K 5/10* (2013.01)

(58) Field of Classification Search
CPC .................................. H02K 5/10; H02K 1/04
USPC ............................................. 310/43, 45, 88
See application file for complete search history.

(56) References Cited

U.S. PATENT DOCUMENTS

2017/0353090 A1* 12/2017 Takaki .................... F16C 33/80

FOREIGN PATENT DOCUMENTS

CN 111247723 B 9/2022
DE 102017221836 A1 * 6/2019 ............ H02K 9/227
WO WO-2019082668 A1 * 5/2019 ............... H02K 5/04

* cited by examiner

*Primary Examiner* — Jose A Gonzalez Quinones
(74) *Attorney, Agent, or Firm* — Keating & Bennett, LLP

(57) ABSTRACT

A motor includes a rotor, a stator, and a casing. The stator includes an iron core and a resin portion covering the iron core. The resin portion includes an abutting portion to abut against a bottom of the casing on one axial side in the casing. The abutting portion is connected in a ring shape around the entire circumference of a central axis, and is closer to a radially inner side than a radially central position of the stator. There is a gap between one axial side of the stator and the casing in the axial direction, and the gap defines a first space. The abutting portion is located on a radially inner side of the first space. The motor is able to prevent debris from invading the rotor.

9 Claims, 2 Drawing Sheets

ELECTRIC MOTOR HAVING AN ACCOMMODATION SPACE FOR RETAINING DEBRIS BETWEEN A STATOR AND A CASING

CROSS-REFERENCE TO RELATED APPLICATIONS

The present application claims priority under 35 U.S.C. § 119 to Chinese Patent Application No. 202310728466.2, filed on Jun. 19, 2023, the entire contents of which are hereby incorporated herein by reference.

1. FIELD OF THE INVENTION

The present: application relates to the field of electromechanical technology, in particular to a motor.

2. BACKGROUND

A motor usually includes a stator, a rotor, and a casing that accommodates the stator and the rotor. During the assembly operation, the stator and/or the rotor are/is pressed into the casing to achieve assembly.

In an inner rotor motor, when a stator iron core is pressed into the casing, debris generated during the pressing process will invade the rotor and scatter as the rotor rotates, affecting the performances of the motor.

It should be noted that the above introduction to the technical background is only for the convenience of a clear and complete description of the technical solutions of the present application, and for the convenience of understanding by those skilled in the art. It cannot be considered that the above technical solutions are known to those skilled in the art just because these solutions are described in the background section of the present application.

SUMMARY

According to an example embodiment of the present application, a motor is provided. The motor includes a rotor, a stator, radially opposite to the rotor and located on a radially outer side of the rotor, and a casing, accommodating at least a portion of the rotor and at least a portion of the stator. The stator includes an iron core and a resin portion covering the iron core. The resin portion includes an abutting portion that abuts against a bottom of the casing on one axial side in the casing. The abutting portion is connected in a ring shape around an entire circumference of a central axis. The abutting portion is closer to a radially inner side than a radially central position of the stator. There is a gap between one axial side of the stator and the casing in the axial direction, and the gap defines a first space. The abutting portion is located on a radially inner side of the first space.

In one or more example embodiments, the first space extends toward a radially outer side from the abutting portion to an edge of the casing.

In one or more example embodiments, a second space is defined between the stator and the casing in a radial direction, the second space is located on one axial side of a back yoke of the iron core, and the second space is communicated with the first space.

In one or more example embodiments, the abutting portion abuts against a bottom of the casing through a seal ring arranged on one axial side of the resin portion.

In one or more example embodiments, the resin portion includes an insulating portion and a molded resin molded on one axial side of the insulating portion, and the abutting portion is integrally defined on the molded resin.

In one or more example embodiments, the molded resin further includes a third space in one axial side that is recessed toward the other axial side, and the third space is communicated with the first space.

In one or more example embodiments, the insulating portion includes a yoke portion located on a radially outer side, and the third space is located on a radially inner side of the yoke portion of the insulating portion.

In one or more example embodiments, the third space is located on one axial side of the insulating portion.

In one or more example embodiments, a radially outer edge of the bottom of the casing is provided with a hole portion penetrating through the casing.

In one or more example embodiments, the abutting portion is closer to the radially inner side than an outer diameter of the rotor.

With reference to the following description and accompanying drawings, example embodiments of the present application are disclosed in detail to indicate a manner in which the principles of the present application may be used. It should be understood that the example embodiments of the present application are not limited thereby in scope. Example embodiments of the present application encompass many changes, modifications and equivalents within the scope of the spirit and terms of the appended claims.

Features described and/or illustrated with respect to one example embodiment may be used in the same or similar manner in one or more other example embodiments, in combination with, or instead of features in other example embodiments.

The above and other elements, features, steps, characteristics and advantages of the present disclosure will become more apparent from the following detailed description of the example embodiments with reference to the attached drawings.

BRIEF DESCRIPTION OF THE DRAWINGS

Elements and features described in one accompanying drawing or one implementation of example embodiments of the present application may be combined with elements and features shown in one or more other accompanying drawings or implementation. Furthermore, in the accompanying drawings, like numerals indicate corresponding components in the several accompanying drawings and may be used to indicate corresponding components used in more than one implementation.

The included accompanying drawings are used to provide a further understanding of the example embodiments of the present application, which constitute a part of the description to illustrate the implementations of the present application, and explain the principle of the present application together with the text description. Apparently, the accompanying drawings in the following description are only some example embodiments of the present application, and those of ordinary skill in the art can also obtain other accompanying drawings according to these drawings without paying creative work. In the accompanying drawings.

DETAILED DESCRIPTION

The foregoing and other features of the present application will become apparent from the following description with reference to the accompanying drawings. In the description and accompanying drawings, specific implementations of the example embodiments of the present application are disclosed, which indicate some implementations in which the principles of the example embodiments of the present application can be adopted. It should be understood that the example embodiments of the present application are not limited to the described implementations. On the contrary, the example embodiments of the present application include all modifications, variations and equivalents that fall within the scope of the appended claims.

In the example embodiments of the present application, the term "and/or" includes any one and all combinations of one or more of the associated listed terms. The terms "comprising", "including", "having" and the like refer to the presence of stated features, elements, component or assemblies, but do not exclude the presence or addition of one or more other features, elements, components or assemblies.

In the example embodiments of the present application, the singular forms "a", "this" and the like may include plural forms, which should be broadly understood as "a kind" or "a class", but not limited to the meaning of "one". In addition, the term "the" should be understood to include both the singular form and the plural form, unless the context clearly dictates otherwise. Furthermore, the term "according to" should be understood as "at least in part according to . . . "; and the term "based on" should be understood as "at least in part based on . . . ", unless the context clearly indicates otherwise.

In the example embodiments of the present application, for the convenience of explanation, a central axis OO' of a motor or a direction parallel to this central axis OO' is called an "axial direction", a radius direction with an axis as a center is called a "radial direction", and a direction around the axis is called a "circumferential direction", but these are only for convenience of explanation and do not limit an orientation of the motor during use and manufacture.

Various implementations of the example embodiments of the present application will be described below with reference to the accompanying drawings. These implementations are only exemplary, but not intended to limit the example embodiments of the present application.

An example embodiment of the present application provides a motor.

Figure 1:
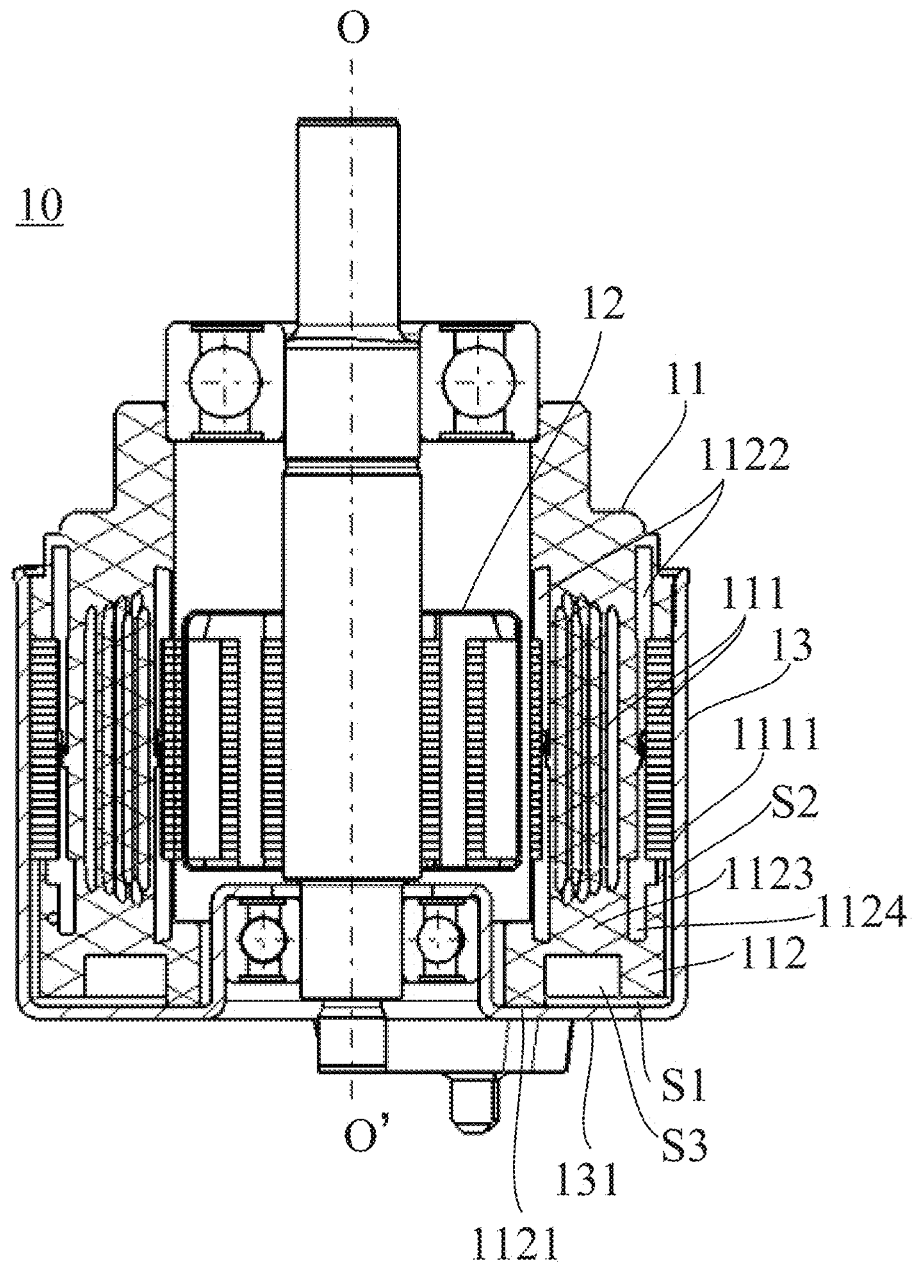
FIG. 1 is a schematic diagram of a motor according to an example embodiment of the present application.

FIG. 1 is a schematic diagram of a motor 10 according to an example embodiment of the present application, showing an axial cross-sectional schematic diagram of the motor 10 that is cut along a central axis OO' and observed.

As shown in FIG. 1, the motor 10 includes a stator 11, a rotor 12 and a casing 13. The stator 11 is radially opposite to the rotor 12 and is located on a radially outer side of the rotor 12. The casing 13 accommodates at least part of the rotor 12 and at least part of the stator 11. That is to say, in the example embodiments of the present application, the motor 10 may be an inner rotor motor.

As shown in FIG. 1, the stator 11 includes an iron core 111 and a resin portion 112 covering the iron core 111.

As shown in FIG. 1, the resin portion 112 includes an abutting portion 1121 that abuts against a bottom 131 of the casing 13 on one axial side in the casing 13.

In the example embodiments of the present application, the abutting portion 1121 is connected in a ring shape around the entire circumference of the central axis OO'. The abutting portion 1121 is closer to a radially inner side than a radially central position of the stator 11. The radially central position of the stator 11 refers to a radially central position of the stator part on one side (the left or right side of the central axis OO' in FIG. 1) of the central axis OO' in an axial cross section shown in FIG. 1.

As shown in FIG. 1, there is a gap between one axial side (O' side) of the stator 11 and the casing 13 in the axial direction. The gap forms a first space S1, and the abutting portion 1121 is located on a radially inner side of the first space S1.

As can be seen from the above example embodiment, the resin portion 112 of the stator 11 includes an abutting portion 1121 that buts against a bottom 131 of the casing 13 on one axial side in the casing 13, the abutting portion 1121 is connected in a ring shape around the entire circumference of the central axis OO', and the abutting portion 1121 is located on the radially inner side of the first space S1 formed by the stator 11 and the casing 13 in the axial direction. Therefore, debris generated during the pressing process of the stator 11 can be accommodated in the first space S1 and shielded by the abutting portion 1121 on the outer side of the rotor 12, thereby preventing the debris from invading the rotor 12 and ensuring the performances of the motor.

In addition, the abutting portion 1121 is closer to the radially inner side than the radially central position of the stator 11, thereby ensuring that the first space S1 has a sufficient size in the radial direction, and further ensuring a space for accommodating the debris.

As shown in FIG. 1, in one or more example embodiments, the first space S1 extends towards a radially outer side from the abutting portion 1121 to the edge of the casing 13, and whereby the first space S1 has enough space to accommodate the debris. However, the present application is not limited to this. For example, the first space S1 may not extend to the edge of the casing 13.

As shown in FIG. 1, in one or more example embodiments, a second space S2 is formed between the stator 11 and the casing 13 in a radial direction, the second space S2 is located on one axial side (O' side) of a back yoke 1111 of the iron core 111, and the second space S2 is communicated with the first space S1.

In the example embodiments of the present application, the stator iron core may include a plurality of radially extending tooth portions and a cylindrical back yoke located on a radially outer side of the tooth portions. In other words, the back yoke is an outer peripheral portion of the iron core. In addition, the structure of the stator iron core may also refer to related technologies.

Therefore, the debris generated during the pressing process of the iron core can fall into the first space S1 through the second space S2, and an accommodation space is expanded through the first space S1.

As shown in FIG. 1, in one or more example embodiments, the resin portion 112 includes an insulating portion 1122 and a molded resin 1123 molded on one axial side (O' side) of the insulating portion 1122, and the abutting portion 1121 is integrally formed on the molded resin 1123. As a result, the abutting portion may be directly formed by the molded resin, without the need for additional processing, which can simplify the molding process.

In this example embodiment of the present application, the insulating portion 1122 for insulation is provided between the stator iron core and a coil. The resin portion 112 includes the insulating portion 1122. In addition, the resin portion further includes a molded resin 1123 on one axial side (O' side) of the insulating portion 1122, and the abutting portion 1121 is provided on the molded resin 1123.

In one or more example embodiments, the molded resin 1123 and the abutting portion 1121 may be integrally formed, thereby simplifying the formation. That is to say, after the iron core is manufactured, the iron core is positioned in a mold, and the molded resin and the abutting portion are integrally formed in a molding manner.

However, the present application is not limited to this. For example, any one of the insulating portion 1122, the molded resin 1123, and the abutting portion 1121 may be independently formed and then assembled, which will not be limited by the present application.

As shown in FIG. 1, in one or more example embodiments, the molded resin 1123 also has a third space S3, on one axial side (O' side), that is recessed toward the other axial side (O side), and the third space S3 is communicated with the first space S1.

Therefore, the third space S3 can further increase the size of a space for accommodating the debris.

For example, in a case where the bottom 131 of the casing 13 is provided with a fixing component penetrating through the bottom to install the motor 10, the fixing component may be a screw, etc. Debris generated during the installation of the fixing component may be accommodated in the third space S3. In addition, in a case where the fixing component penetrates through the bottom 131 and protrudes from the inner side of the bottom 131 of the casing, the protruding part may be accommodated in the third space S3 to avoid the fixing component from interfering with other components inside the motor.

In this example embodiment of the present application, the first space S1, the second space S2 and the third space S3 may each have a shape extending in a circumferential direction and covering the entire circumference, but the present application is not limited thereto. For example, there may be a plurality of second spaces S2 arranged at intervals in a circumferential direction, and there may also be a plurality of third spaces S3 arranged at intervals in a circumferential direction, which will not be limited in the present application. The specific implementations may be determined according to actual needs.

As shown in FIG. 1, in one or more example embodiments, the insulating portion 1122 includes a yoke portion 1124 located on a radially outer side, and the third space S3 is located on a radially inner side of the yoke portion 1124 of the insulating portion 1122. Therefore, the third space S3 can be prevented from interfering with the yoke portion of the insulating portion.

However, the present application is not limited thereto. The third space S3 may also partially overlap with the yoke portion 1124 in an axial direction.

In one or more example embodiments, the third space S3 is located on one axial side of the insulating portion, which can prevent the third space from interfering with the insulating portion and a coil of the stator iron core. That is, the molded resin 1123 has a sufficient size in the axial direction to form the third space S3, so that the third space S3 can be located on one axial side of the insulating portion, thereby preventing the interference.

However, the present application is not limited thereto. For example, when viewed from a radial direction, the third space and the insulating portion may also have overlapping portions.

In one or more example embodiments, a radially outer edge of the bottom 131 of the casing 13 is provided with a hole portion penetrating through the casing 13. therefore, it facilitates the discharge of debris generated during the pressing process of the stator.

In the example embodiments of the present application, there is no restriction on the specific shape of the hole portion. For example, the hole portion may have a shape in which a hole diameter of a portion facing the inner side of the casing is larger than a hole diameter of a portion facing the outer side of the casing, thereby preventing external impurities from entering into the casing while facilitating the discharge of debris. However, the present application is not limited thereto, and the hole portion may also be in other shapes.

In the example embodiments of the present application, the number of hole portions is not limited. The number of hole portions may be plural. The plurality of hole portions may be arranged at equal or unequal intervals along a circumferential direction, which will not be limited in the present application.

As shown in FIG. 1, in one or more example embodiments, the abutting portion 1121 is closer to a radially inner side than the outer diameter of the rotor 12. Therefore, a labyrinth structure can be formed among the resin portion 112, the casing 13, and the rotor 12, which can further prevent debris from invading the rotor.

However, the present application is not limited thereto. For example, the abutting portion 1121 may also be radially aligned with the outer diameter of the rotor 12 or closer to the radially outer side than the outer diameter of the rotor 12.

In the example embodiments of the present application, as shown in FIG. 1, the abutting portion 1121 may directly abut against the bottom 131 of the casing 13, but the application is not limited thereto. The abutting portion may also indirectly abut against the bottom of the casing.

Figure 2:
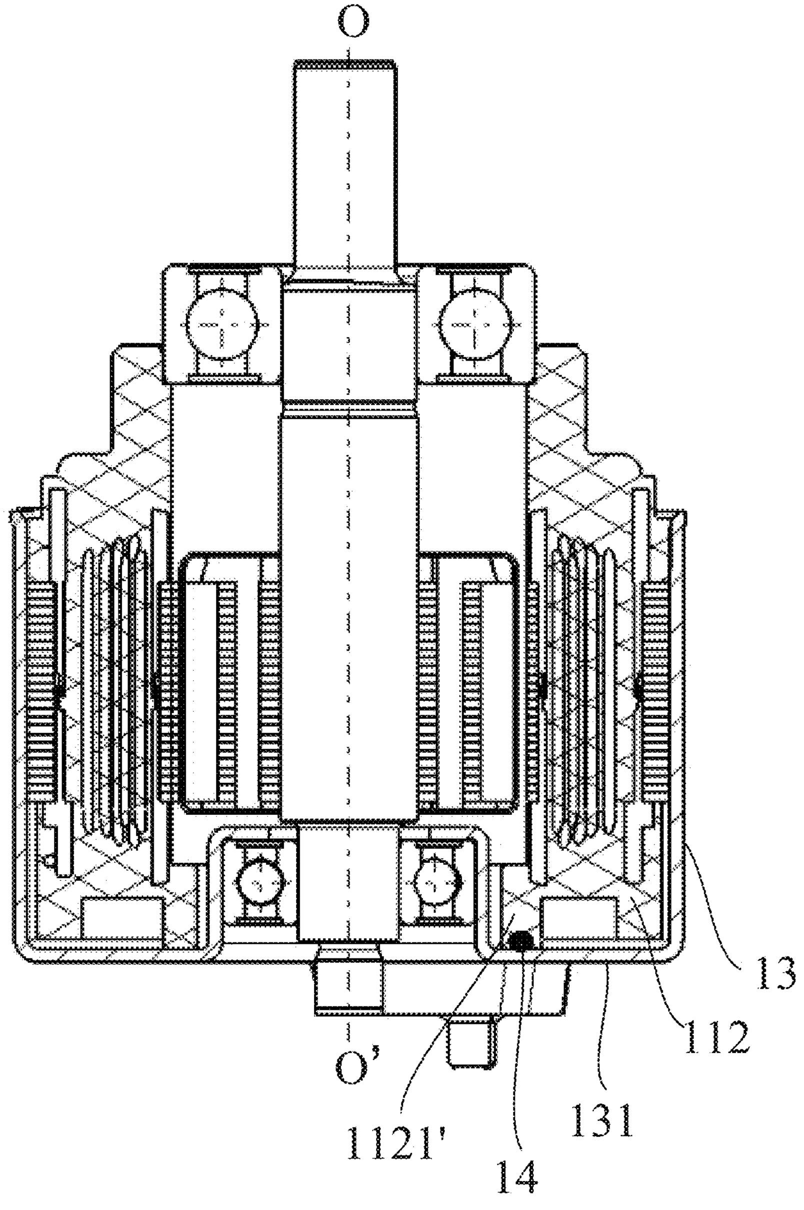
FIG. 2 is another schematic diagram of a motor according to an example embodiment of the present application.

FIG. 2 is another schematic diagram of a motor according to an example embodiment of the present application, showing a case where the abutting portion indirectly abuts against the bottom of the casing.

As shown in FIG. 2, in one or more example embodiments, an abutting portion 1121' abuts against the bottom 131 of the casing 13 through a seal ring 14 arranged on one axial side (O' side) of the resin portion 112.

Therefore, on the one hand, the seal ring for an abutting purpose makes the abutment more reliable. On the other hand, the elasticity of the seal ring prevents hard interference with the bottom of the casing when the stator is pressed in, which improves the degree of design freedom.

In one or more example embodiments, a groove may be formed in an end on one axial side (O' side) of the resin portion 112 to accommodate at least part of the seal ring 14, thereby preventing the seal ring 14 from escaping and ensuring a sealing effect.

It is worth noting that the above FIGS. 1 to 2 only schematically illustrate the motor in the example embodiments of the present application, but the present application is not limited thereto. The specific content of various structures or components may also refer to related technologies. In addition, structures or components which are not shown in FIGS. 1 to 2 may also be increased; or one or more structures or components in FIGS. 1 to 2 may be decreased. Components or elements not specifically specified in FIGS. 1 to 2, such as the motor that may also include a bearing and the like, can refer to related technologies, and the present application does not limit them.

As can be seen from the above example embodiments, the resin portion of the stator includes an abutting portion that abuts against the bottom of the casing, the abutting portion is connected in a ring shape around the entire circumference of the central axis, and the abutting portion is located on the radially inner side of the first space formed by the stator and the casing in the axial direction. Therefore, the debris generated during the pressing process of the stator can be accommodated in the first space and shielded by the abutting portion on the outer side of the rotor, thereby preventing the debris from invading the rotor and ensuring the performances of the motor.

The example embodiments of the present application are described above in conjunction with the specific implementations, but those skilled in the art should be clear that these descriptions are exemplary and are not intended to limit the protection scope of the example embodiments of the present application. Those skilled in the art can make various variations and modifications to the present application according to the spirit and principles of the example embodiments of the present application, and these variations and modifications are also within the scope of the example embodiments of the present application.

The preferred implementations of the example embodiments of the present application are described above with reference to the accompanying drawings. Many features and advantages of these implementations are clear according to the detailed description. Therefore, the accompanying claims are intended to cover all these features and advantages that fall within the true spirit and scope of these implementations. Furthermore, since those skilled in the art is prone to think of many modifications and changes, it is not intended to limit the implementations of the example embodiments of the prevent disclosure to the precise structure and operations shown and described, but to cover all suitable modifications and equivalents that fall within its scope.

Features of the above-described preferred example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A motor comprising:

a rotor;

a stator, radially opposite to the rotor and located on a radially outer side of the rotor; and a casing, accommodating at least a portion of the rotor and at least a portion of the stator; wherein the stator includes an iron core and a resin portion covering the iron core;

the resin portion includes an abutting portion to abut against a bottom of the casing on one axial side in the casing;

the abutting portion is connected in a ring shape around an entire circumference of a central axis, and is closer to a radially inner side than a radially central position of the stator;

a gap is between one axial side of the stator and the casing in the axial direction, and the gap defines a first space;

the abutting portion is located on a radially inner side of the first space;

a second space is defined between the stator and the casing in a radial direction;

the second space is located on one axial side of a back yoke of the iron core;

the second space is communicated with the first space; and the first space and the second space define portions of an accommodation space structured to retain debris.

2. The motor according to claim 1, wherein the first space extends towards a radially outer side from the abutting portion to an edge of the casing.

3. The motor according to claim 1, wherein the abutting portion abuts against the bottom of the casing through a seal ring located on one axial side of the resin portion.

4. The motor according to claim 1, wherein the resin portion includes an insulating portion and a molded resin molded on one axial side of the insulating portion; and the abutting portion is integrally provided on the molded resin.

5. The motor according to claim 4, wherein the molded resin further includes a third space on one axial side that is recessed toward the other axial side; and the third space is communicated with the first space.

6. The motor according to claim 5, wherein the insulating portion includes a yoke portion located on a radially outer side; and the third space is located on a radially inner side of the yoke portion of the insulating portion.

7. The motor according to claim 5, wherein the third space is located on one axial side of the insulating portion.

8. The motor according to claim 1, wherein a radially outer edge of the bottom of the casing is provided with a hole portion penetrating through the casing.

9. The motor according to claim 1, wherein the abutting portion is closer to a radially inner side than an outer diameter of the rotor.

* * * * *